United States Patent [19]
Forsyth et al.

[11] 3,785,514
[45] Jan. 15, 1974

[54] VEHICULAR TRANSPORTATION SYSTEM AND APPARATUS

[76] Inventors: John P. Forsyth; Robert W. Forsyth, both of 1517 N. 3rd Ave., Upland, Calif. 91786

[22] Filed: Mar. 16, 1971

[21] Appl. No.: 124,808

[52] U.S. Cl............ 214/38 R, 105/368 R, 296/1 A
[51] Int. Cl.............................................. B65g 67/02
[58] Field of Search................. 214/38 R, 38 D, 85; 296/1 A; 105/368 R; 104/20, 28, 29, 27

[56] References Cited
UNITED STATES PATENTS

| | | | |
|---|---|---|---|
| 3,285,194 | 11/1966 | Clejan | 105/368 R X |
| 3,228,352 | 1/1966 | Johnson | 105/368 R |
| 3,584,584 | 6/1971 | Milenkovic | 105/368 R |
| 3,369,684 | 2/1968 | Ford | 214/515 |
| 2,432,228 | 12/1947 | DeLano | 214/85 X |
| 2,541,288 | 2/1951 | Rice | 214/85 |

FOREIGN PATENTS OR APPLICATIONS

| | | | |
|---|---|---|---|
| 1,280,500 | 11/1961 | France | 214/38 D |

Primary Examiner—Robert G. Sheridan
Attorney—Roger A. Marrs

[57] ABSTRACT

The vehicular transportation system and apparatus disclosed herein includes a main traffic course or artery extending between populated areas and communities, self-propelled transporter vehicles for operation thereon and a systematized means for their processing therealong, local surface street networks, and individual, self-propelled satellite passenger vehicles or cars for use therearound. Each transporter vehicle is adapted to carry a plurality of the satellite cars in controlled groups. The loaded transporter vehicles selectively enter and exit the main traffic artery by interchange means provided at predetermined locations along its length. Means are selectively operable to serve as guide means for loading and unloading the plurality of satellite cars with respect to a transporter vehicle. Any one of the satellite cars can enter or leave a controlled group, a transporter vehicle can exit the main traffic artery and the satellite car, utilizing its means of self-propulsion, may return to surface streets and operate thereon independently.

2 Claims, 5 Drawing Figures

PATENTED JAN 15 1974

INVENTORS
JOHN P. FORSYTH
ROBERT W. FORSYTH
BY
Roger A. Marrs

JOHN P. FORSYTH
ROBERT W. FORSYTH
INVENTORS

VEHICULAR TRANSPORTATION SYSTEM AND APPARATUS

BACKGROUND OF THE INVENTION

1. Field of the Invention

This invention relates to interurban/intracity transportation systems and, more particularly, to a novel system and apparatus incorporating options for personal-choice travel in which a plurality of individual self-propelled satellite passenger vehicles or cars are selectively combined in a controlled group of vehicles in a transporter vehicle for travelling at a common, uniform speed along a main traffic artery and which are adapted to be diverted or separated from the controlled group at the selection of the driver for each of the individual vehicles or cars at selected stop locations of the transporter vehicle.

2. Description of the Prior Art

Man's improved technology has wrought tremendous advantages in many fields, but relatively little has been done in the field of interurban/intracity transportation systems that has practical value. The prior art in the field may be viewed, for the sake of brevity, as consisting of two broad categories — the existing, currently used conventional transportation systems, private and public; and the various experimental and developmental transportation systems proposed for use in the near future.

The first category is comprised of the internal-combustion engine automobile operating on existing street and road networks and subject to various traffic-flow control devices; public transit bus systems, and trolleys, both those operating on rails and the externally powered, so-called trackless trolleys; public, right-of-way, rail transit systems; and public, right-of-way, suspended or straddle-type monorail transportation systems. The second category is comprised of hydrid-type automobiles, powered by various combinations of heat-engines and electrical power and drive systems, and electrically driven automobiles receiving energy from batteries and fuel cells, both types proposed for operation on existing public street and road networks; dual-mode transportation systems in which small automobiles or bus-like vehicles, incorporating conventional, electrical, or hybrid propulsion systems, may operate in a self-propelled mode on public street and road networks, or may operate on a guideway, track, or monorail system providing external power and automated traffic-flow controls; dual-mode transportation systems in which the vehicles, in the controlled mode, incorporate means for the creation of, and maintenance of air-cushions for vehicle support, suspension, and/or tracking; tube-type transportation systems, in which vehicle motion is achieved by gravity, vacuum, or electrical means, air screws, thrust engines, etc.; and public, high-speed, right-of-way transportation systems comprised of single cars or trains, operating on rails or guideways, supported by wheels, air-cushions, or electromagnetic levitation.

The disadvantages of the prior art, both in existing and proposed transportation systems, are many, however, the most important relate to problems of environmental pollution, lack of provision for personal-choice travel, unsatisfactory economics, and an inherent potential for rapid obsolescence. For example, primary dependence on use of the internal-combustion engine automobile for interurban/intracity travel is a major cause of air pollution, traffic congestion, and noise pollution, and, while a one-for-one conversion to electrically or hybrid powered vehicles may be expected to reduce air pollution, perpetuation of the same private-vehicle use patterns would not alleviate congestion or reduce noise pollution, nor would it reduce constantly increasing requirements for more streets, highways, and parking areas which are expensive to construct, aggravate tax-base problems, and represent poor land utilization. Transit bus and trolley systems also have serious drawbacks, which would not be altogether eliminated by a change to low-pollutant power systems. The most basic problem lies in the fact that transit bus and trolley systems are not flexible enough to be truly responsive to the needs of the individual passenger - they cannot provide personal-choice travel. Characteristically, too, such systems cannot offer a really pleasant travel environment. Consequently, they cannot compete effectively with the private automobile. This leads to underutilization and unprofitable operations.

Right-of-way, rail transportation systems (contemporary and advanced high-speed types), tube systems, monorails, and tracked, air-cushion systems are potentially vulnerable to underutilization, too, because they also cannot compete with the freedom, privacy, and pleasant environment the private automobile offers. However, a far more critical prblem is created by the enormous capital outlays needed to acquire rights-of-way and fund the construction of inflexible, single-function, geographically-fixed systems which may quickly be made obsolete by advances in technology, changing use patterns, and changes in population distribution.

Dual-mode transportation systems, based on the use of some type of guideway or track network with external power sources and automated traffic-flow controls, could generally be made flexible enough to provide personal-choice travel, and privacy and a pleasant environment in individual, dual-mode, street/guideway vehicles. Nonetheless, all such systems now in development or proposed also are severely handicapped in practical application by complexity, requirements for expensive rights-of-way, the costs of constructing and operating power distribution systems in the guideway or track to supply external power to the individual vehicles in the guided mode, and the need for some type of mechanical or electromechanical means of assuring that all vehicles using the guideway or tracks are inspected immediately prior to such use to assure their maintenance to uniform mechanical and functional standards to prevent system malfunctions and service interruptions caused by vehicle breakdowns.

Illustrative of these drawbacks in developmental and proposed dual-mode transportation systems is a prior attempt to provide an automatic vehicular monorail transportation system disclosed in U. S. Letters Patent Nos. 3,101,677; 3,143,020 and 3,118,392 which generally provide for an automatic vehicular monorail system in which self-propelled vehicles automatically move from station to station with little or no manual control required. Conventional internal-combustion engine passenger vehicles are employed which are modified to include a receiver structure secured to the roof thereof adapted to be detachably engaged with a pick-up member movably carried on a conveyor system. Obviously, such a system encounters a variety of problems and difficulties involving first, the securement of the receiver member onto the conventional car and, secondly, providing a means for stabilizing the car once it has been picked up by the conveying system. Another difficulty resides in the fact that the system is not readily adapted for high speed operation in foul weather environments and the mechanism necessary to effect pickup and detachment of the cars on an individual basis is extremely cumbersome and, in its exposed position, is liable to damage which could cause malfunctions when engaged with the conveyor resulting in system breakdowns and service interruptions. It will also be noted that application of the system entails acquistion of rights-of-way for the monorail and obviously would require substantial capital outlays to build the monorail structure and conveyor mechanism. Furthermore, such a system seriously suffers from a control point of view since no means are provided for varying the spacing between one or more cars once the car has been combined with the conveyor system.

In addition, transportation systems which employ conventional vehicles having internal combustion engines do not alter the serious air pollution conditions existing in major cities. Major modification is required to convert such conventional vehicles for use in automatic control systems wherein programmed processing of a plurality of vehicles is anticipated not only for system flexibility but for safety purposes.

Therefore, a need has long been present for a truly practical interurban/intracity transportation system which successfully combines the advantages of mass rapid transit with the freedom of personal-choice travel and the pleasant environment afforded by the private automobile, which is economical, adapted for programmed control and which permits employment of individual vehicles operable in a controlled grouping on a predetermined course or main traffic artery or separately operable as an independent vehicle on conventional roadways and surface streets under its own power.

SUMMARY OF THE INVENTION

Accordingly, the novel transportation system and apparatus of the present invention obviates the problems and difficulties encountered with prior systems and equipment and provides a continuous flow concept in which small satellite passenger vehicles or cars incorporating a power means are used in a self-propelled mode on conventional roadways and surface streets. A transporter vehicle is employed for transporting a plurality of these satellite passenger vehicles or cars on a conventionally designed rapid transit main traffic artery or freeway. An on-ramp is provided leading to the main traffic artery for accommodating entry of an approaching transporter vehicle so that it may merge with on-coming controlled groups of other transporter vehicles.

Each controlled group of transporter vehicles may be under the direction of a remote radio control system so as to determine safe and convenient spacing or intervals between adjacent controlled transporter vehicle groupings or single transporter vehicles. The satellite passenger vehicles or cars are individually self-propelled on the surface streets. Guide means and lock means are provided for effecting controlled combining and separation of a particular satellite vehicle or car with and from its combined group so that selective exiting of each satellite passenger vheicle or car may be readily achieved.

A feature of the invention resides in the fact that the satellite passenger vehicle or car is fully equipped with a power means, preferably an electrical traction or induction type, drive train, steering mechanism, and braking system. Means for releasably engaging each satellite passenger vehicle or car in the group is provided on the transporter vehicle and means adapted to be laterally extended are provided for cooperating with the guide means for effecting loading and exiting of the satellite vehicles or cars to and from the transporter vehicles.

Therefore, it is among the primary objects of the present invention to provide a vehicular transportation system which includes a plurality of individual self-propelled satellite vehicles or cars adapted to travel in a combined group on a transporter vehicle at a common, uniform speed on a main transit course or traffic artery to a selected designated exit means located along the course, and once the transporter vehicle is diverted to such an exit means, each individual satellite car is separable from the transporter vehicle to be operated under its own power for continued travel along surface streets.

A further object of the present invention is to provide a novel mass transportation system involving a plurality of self-propelled satellite passenger vehicles or cars adapted to be introduced in a controlled grouping of similar satellite cars to a main transit course or traffic artery whereby motive power is provided via a transporter vehicle capable of holding and conveying the plurality of occupied satellite cars in combination, thereby substantially reducing the energy expended below that which would be expended, regardless of the type of power means, if conventionally sized automobiles equal in number to the satellite cars conveyed by the transporter were independently and separately operated over the same main transit course or traffic artery.

Another object of the present invention is to provide a novel mass transportation system involving a plurality of self-propelled satellite passenger vehicles or cars adapted to be introduced in a controlled grouping of similar satellite cars to a main transit course or traffic artery whereby power and steering is automatically controlled and provided via a transporter vehicle capable of holding and conveying the plurality of satellite cars and during which conveyance the satellite cars are in an essentially inactive state.

Still another object of the present invention is to provide a novel mass transportation system involving a plurality of self-propelled satellite passenger vehicles or cars adapted to carriage in an inactive or non-operating state on a transporter vehicle for conveyance along a main transit course, the inactive or non-operating state of the satellite cars during such carriage obviating the necessity of assuring by prior inspection that all the satellite cars are maintained to uniformly rigid and high standards of mechanical condition.

Another object of the present invention is to provide a novel rapid mass transportation system and apparatus therefor including a plurality of satellite passenger vehicles or cars adapted to be arranged in controllable groups on a continuous two-way course, either elevated, surface, or underground, and including a carrier or transporter vehicle for holding and conveying the controlled groups of satellite cars. is to provide a novel rapid mass transportation system and apparatus in which the plurality of self-propelled satellite passenger vehicles or cars may be controllably grouped together on a common transporter vehicle which includes guiding and locking means for separating selected ones of the satellite cars from the controlled group so that the selected satellite car may disembark from the transporter vehicle and be exited from the continuous course under its own power for sustained driving on conventional roadways or surface streets.

Yet another object of the present invention is to provide a novel rapid mass transportation system and apparatus in which each satellite passenger vehicle or car of a plurality adapted to be accommodated by a continuous main transit course or traffic artery is fully equipped as an operational vehicle adapted to travel on conventional surface streets and roadways.

A further object of the present invention is to provide a novel mass transportation system permitting commuters to travel main traffic arteries and surface street networks point-to-point without transfer and without changing vehicles during the course of travel.

Still a further object of the present invention is to provide a novel personal transportation system available at any time during the day for point-to-point transportation, comfortably and with privacy, within densely populated areas wherein the system is adapted for essentially automated combination of separate self-propelled satellite vehicles or cars as well as means for effecting single satellite car separation therefrom.

It is still a further object of the present invention to provide a novel personal transportation system available for point-to-point transportation with comfort and privacy by employing a plurality of self-propelled satellite electric vehicles or cars adapted for individual and independent travel on conventional roadways and surface streets as well as adapted to be combined with other vehicles of the same type in a controlled grouping on a transporter vehicle for travel along a continuous main transit course or traffic artery.

A broad objective of the present invention is to provide a readily achievable, low-cost, multi-mode, multi-function transportation system especially adapted to the interurban/intracity and local suburban movement of people and goods that offers a combination of the advantages of personalized, individual travel and mass transit with a substantial reduction in expenditure of energy and attendant reduction of air pollution and the noise pollution and congestion now associated with conventional means of transportation.

A further object resides in the provision of a novel transportation system which can productively utilize existing networks of surface streets, freeways, expressways, and highways without interference with their originally intended function and the use thereof by existing or future conventionally configured and propelled passenger and cargo vehicles, and further, a transportation system which will not require for its operation a heavy investment in fixed, inflexible, obsolescence-prone rights-of-way, structures and facilities.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

DESCRIPTION OF THE PREFERRED EMBODIMENT

Figure 1:
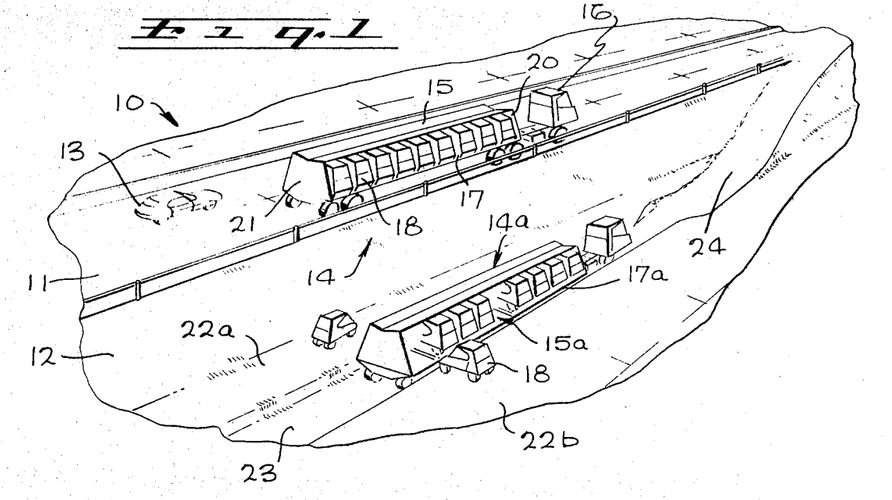
FIG. 1 is a perspective view of the vehicular transportation system and apparatus of the present invention illustrating a typical loading procedure and travel along a main traffic artery.

Referring now to FIG. 1, a diagrammatic illustration is shown in perspective in which the main freeway or traffic artery of the transportation system and apparatus of the present invention is indicated by numeral 10 extending between populated areas. Additional populated areas are located between the major population centers and may be representative of smaller populated communities. However, it is to be understood that the transportation system may readily extend across a metropolis in which the communities may be considered a suburban community and downtown area, respectively, with other subcommunities located therebetween. The transportation system may follow a route which interconnects with the subcommunities or the system may directly interconnect by means of other routes. In either event, the main traffic artery or course of the system route is a continuous two-way road or freeway which may be elevated, subterranean, or constructed on the ground surface. The system roadway is intended to handle a large volume of vehicular traffic for commuter and ex-urban travel from center-to-center or point-to-point whether between cities or intracity transportation at normal speeds in private and comfortable vehicular units.

In FIG. 1, the highway, roadway or course upon which the system functions is indicated by numeral 11 which takes the form of pavement carried on the ground surface of an elevated or raised roadbed 12. The roadway as indicated includes two lanes going in one direction with other lanes for opposite travel located elsewhere. This arrangement is illustrated for simplicity so that description of the present invention will be readily understood.

The freeway 11 may be a conventional freeway over which conventional automobiles, trucks or the like may travel in accordance with the normal rules of the road. To illustrate this point, a conventional automobile 13 is illustrated traveling in one of the two lanes.

The present invention uses or employs a transporter vehicle 14 that comprises a semitrailer portion 15 which is detachably coupled to a motorized truck tractor 16 that is employed to propel or move the combined tractor and semitrailer along the roadway 11. The tractor 16 is provided with axles and wheels sets and includes conventional steering, power plant, and suitable controls for steering, braking and releasably coupling to the semitrailer 15. In general, the trailer 15 includes a wheeled chassis with flatbed or platform 17 for supporting a plurality of compact satellite passenger vehicles or cars, such as vehicle 18. The plurality of vehicles 18 are disposed side-by-side on the flatbed or platform 17 between end partitions 20 and 21, respectively. The roof of the semitrailer comprises an elongated section interconnecting the opposite end partitions 20 and 21 so that the compact satellite cars are protected from adverse weather effects of snow, rain, wind or the like. It is preferred that the opposite sides of the semitrailer remain open so as to facilitate lateral movement of the individual satellite cars to and from the transporter during loading and unloading procedures.

The need for simplifying the procedure for loading or unloading the plurality of satellite vehicles or cars is obvious. Since the cars are independently operated by their respective drivers during the procedure. its simplification assures maximum control for drivers possessing average skills in maneuvering and minimizes the time required to complete the procedure. The operator need only drive his car onto a ramp divided into ramp and platfrom portions 22a and 22b where the operator may then proceed to drive his car into a vacant space provided on the semitrailer 15a. The tractor and semitrailer comprising the transporter vehicle 14a is parked in a lowered roadway or channel 23 so that the flat platform 17a is substantially flush with the loading ramps and platforms 22a and 22b. This forms a loading and unloading or collection/distribution station with drive-on/drive-off platforms whereby the individual satellite vehicles or cars 18 may be placed in proper position on the semitrailer or removed therefrom according to the desire of the individual operators. The lowered or reduced roadway or channel 23 extends through an inclined on-ramp 24 which connects with the main roadway 11 for permitting the transporter vehicle to travel thereon. The on-ramp 24 is of sufficient length to permit the transporter vehicle to enter the main traffic artery or roadway 11 so as to interweave or otherwise merge safely with on-coming traffic.

At predetermined locations along the length of the roadway 11, there are provided access means by which transporter vehicles may enter and merge with the mainstream of traffic carried on the roadway 11 as well as permitting a transporter vehicle to exit therefrom. The on-ramp 24 is provided in which an approaching transporter vehicle is introduced to a right-hand lane with the roadway 11. It is to be understood that the mainstream of traffic traveling in the lanes of the roadway are in the same or opposite directions pursuant to the conventional driving custom by which drivers drive in the right-hand lane in their direction of travel.

It is to be understood that the opposite end of the lowered roadway or channel 23 from its end connecting the on-ramp 24 connects with an off-ramp connected to the roadway 11 so that the transporter vehicle 14 may readily leave traffic for loading and unloading purposes.

By arranging the satellite passenger vehicles or cars in a group, control can be more effective than if the vehicles required individual attention. Each of the compact satellite cars 18 incorporates a means for self-propulsion. When the plurality of satellite cars 18 are in a controlled group on a transporter vehicle, the satellite cars are carried in common on the roadway 11. The power source of the transporter vehicle is sufficient to pull a fully loaded semitrailer and yet expend substantially less energy than would be expended if a group of conventional automobiles, equal in number to the satellite cars carried by the transporter, were separately and independently operated over the same route traveled by the transporter. It is also envisioned that more trailers may be detachably connected to semitrailer 15 so that trailers may be dropped or disconnected at various selected station locations along the route and other trailers picked up and carried on so that the transporter vehicle need not remain at any one loading station for prolonged periods of time.

The individual compact satellite passenger vehicle or car 18 is suitable for accommodating a driver and at least one passenger. However, it is to be understood that the size and accommodations of the satellite car may vary somewhat. Each such car includes a steering mechanism intended to be employed by the car's driver or operator to control the direction of travel when the car is employed on a conventional roadway or surface street under its own power. The satellite car also incorporates a suitable brake system and in the preferred form there is conveniently mounted on the chassis of the vehicle an electric traction or induction motor/s with sufficient battery power packs for operating the vehicle on surface streets for prolonged lengths of time without recharging. Suitable controls are provided for operating both the electric power plant and the brake or other systems of the car.

Figure 2:
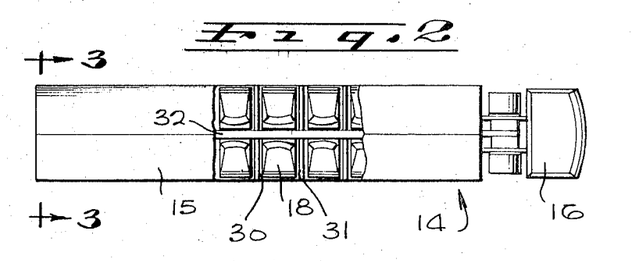
FIG. 2 is a top plan view of a transporter or carrier vehicle having a portion of the roof broken away to expose a plurality of compact satellite vehicles or cars loaded therein.

Referring now in detail to FIG. 2, an enlarged illustration is shown of transporter vehicle 14 which includes truck tractor 16 for hauling or moving semitrailer 15. It can be seen that the semitrailer 15 includes a plurality of spaces or areas indicated by numeral 30 which are marked or outlined by painted stripes, curbing or the like, so as to define a parking space. The curbing or marking is indicated by numeral 31 and is intended to be clearly visible to the operator of a vehicle 18 so that he may drive into the parking space with safety. The marking or curbing 31 is considered to be laterally disposed in fixed, spaced apart increments along the length of the trailer while a continuous longitudinal curbing 32 is provided to separate adjacent rows of parking spaces. Longitudinal curbing 32 also operates as a stop means or chock to support or stabilize the vehilce in its parking space.

Figure 3:
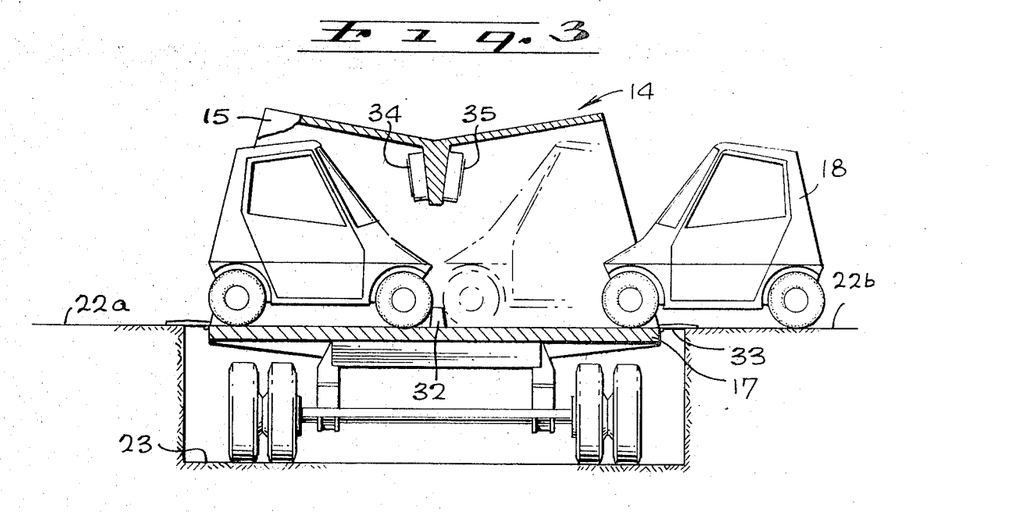
FIG. 3 is an enlarged transverse cross-sectional view of the transporter vehicle showing a satellite car side loading or side unloading procedure as taken in the direction of arrows 3—3 of FIG. 2.

As noted in the enlarged view of FIG. 3, the vehicles 18 are driven onto the ramp and platform means 22a or 22b and directed into an open parking space on the car accommodation deck or flatbed platform 17. The cars are loaded through the lateral access openings in the side of the semitrailer 15 and continue towards the center of the vehicle until stopped by engagement of the front wheels with the longitudinal curb 32. Once the satellite car has been loaded on the transporter, its power plant may be turned off and the driver may relax. If desired, an intermediate ramp 33 may be pivotally carried on the edge of platform or deck 17 to permit smooth travel of the vehicle 18 in moving from the ramp to the transporter vehicle. Intermediate ramp 33 may be pivotally attached so that when the car 18 is in its proper space, the ramp may be actuated so as to engage with the rear wheels of the cars to prevent inadvertent separation from the transporter vehicle.

If desired, the carrier transporter vehicle's semitrailer 15 may be provided with movable sidewalls that would enclose the car accommodation deck or platform so that air conditioning, heating or other environmental systems may be installed and operated for the convenience of the passengers when the transporter vehicle is en route. Additionally, for entertainment and instruction of the drivers and passengers in the satellite cars, a closed circuit television system may be provided wherein the display units are indicated by numerals 34 and 35 respectively.

Figure 4:
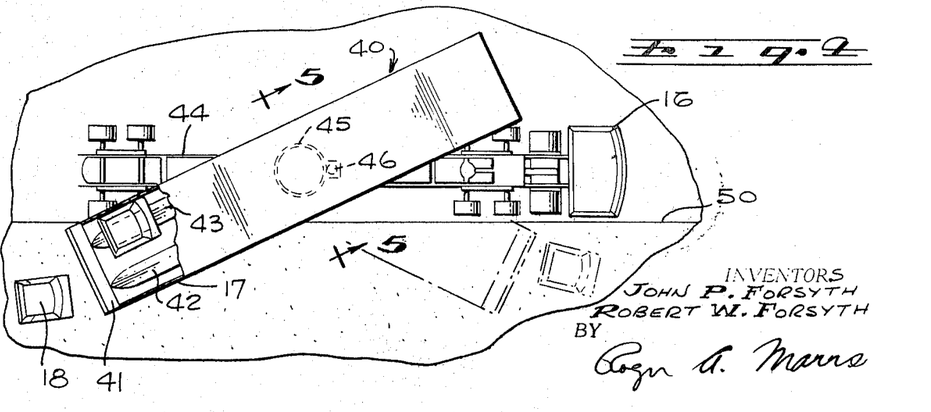
FIG. 4 is a top plan view of another transporter or carrier vehicle modified to provide end loading and unloading of the satellite cars.
Figure 5:
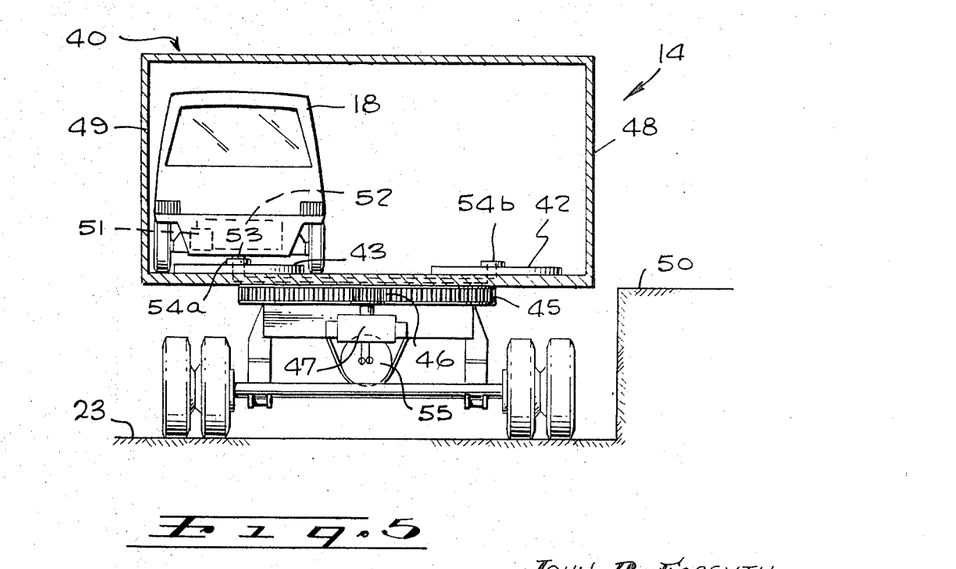
FIG. 5 is an enlarged cross-sectional view of the modified transporter vehicle shown in FIG. 4 as taken in the direction of arrows 5—5 thereof.

Referring now in detail to FIG. 4, another embodiment of the present invention is shown wherein the side loading procedure previously described in connection with the semitrailer 15 is modified so that loading of vehicles 18 may be achieved from either end of a semi-trailer 40. Semi-trailer platfrom 17 is preferably completely enclosed except during loading and unloading procedures when the semitrailer's opposite ends are opened and provide accommodation ramps such as indicated by ramp 41. The cars enter from platform 50 over ramp 41 and are guided into position by means of raised portions or shoulders 42 and 43 respectively so that the vehicle 18 may progress to the opposite end without departure from the raised guiding shoulder 42 or 43. The semitrailer 40 carries pivotally mounted on a chassis 44 a rotatable platform or flatbed 17 powered by means of a ring and pinion gear indicated by numerals 45 and 46 respectively. As shown in FIG. 5, an hydraulic means 47 is employed for powering the rotating action of the flatbed or platform 17 and the controls for actuation are under the supervision of the transporter operator. As indicated earlier, the semitrailer 40 includes sidewalls 48 and 49 which may include access doors, and windows for passenger or maintenance convenience.

Broadly considered, this invention has to do with the design for, and the components, elements and mechanisms comprising a transportation system. Being more specific, it relates to a transportation system especially adapted to the interurban/intracity, and local suburban movement of people and goods. It incorporates provisions for both personal, individual mobility (personal-choice travel), and mass rapid transit depending on trip distance and location.

Referring to the FIGS. 1-3 of the transportation system, it can be seen that it consists essentially of:
(1) A number of physically small, compact, lightweight, satellite cars or passenger vehicles 18, preferably electrically driven and powered by batteries; (2) A number of transporter vehicles 14 for the cars having generally the configuration of a truck-tractor/semitrailer combination and being either conventionally powered by internal combustion, piston engines, or by such relatively unconventional means as gas turbines or hybrid power systems; (3) A number of strategically located, simply structured, collection/distribution stations wherein the satellite cars may be readily driven on to or off the transporter vehicles; and (4) The existing and future network of surface streets, freeways, expressways, and highways found in, and providing for point-to-point access in, all large cities and the surrounding suburban areas.

The functioning of the system is quite straight-forward. In suburban areas, at the start of a typical working day, the satellite cars 18 each carry one or two passengers from their homes over a short distance to collection/distribution stations located near an expressway or freeway 11. At the collection/distribution stations, ramp and platfrom means 22 and other facilities are provided to bring the satellite cars and the decks or flatbed platforms 17 of the transporter vehicles 14 to the same elevation so that the cars may be easily driven onto the transporter 14 and disposed thereon laterally or longitudinally. A locking means is provided to secure the cars on the transporters. The cars, with their passengers, are then carried by the transporter vehicles onto the expressway or freeway 11, and the medium-distance trip to the central city area is completed. Once in the central city, the transporters 14 move off the expressway or freeway to conveiently located, downtown collection/distribution stations. The satellite cars are then driven off the transporter vehicles and continue on with their passengers for the short distance to their ultimate destinations within the central city. At the end of the day, the flow would be reversed, the satellite cars 18 being collected by the transporters 14 in the central city, and being carried out over the expressway or freeway network to the surrounding suburban areas where they would move off the transporter vehicles 14 at local collection/distribution stations and complete the final, short leg of the journey home.

The system functions in the manner described not just during peak commuter hours but for 24 hours a day, seven days a week, at reduced frequencies adjusted to demand. During off-hours, the transporter vehicles in excess of requirements could be used to carry containerized, general cargo throughout the central city and suburban areas. The satellite cars, too, could be used for local travel both in the central city and in the suburban areas.

With respect to details on components of the system, the typical satellite car or vehicle 18, as can best be seen in FIG. 3, will be configured to the smallest possible envelope dimensions consistent with comfortably accommodating two adult passengers (with additional space for miscellaneous packages and briefcases), and incorporating controls, power and drive subsystems, suspension elements, and wheeled running gear. The car is of light and durable construction, utilizing high strength/weight ratio metals and plastics to minimize curb weight and minimize power requirements. The object of keeping the satellite car 18 as small as possible is to assure that the transporter vehicle 14 can accommodate a great number of cars and yet not exceed the dimensional limits imposed to enable its use of existing freeways, expressways, and surface streets without impeding normal traffic flow.

As mentioned previously, the satellite cars 18 will preferably be electrically driven and powered by batteries; however, alternative means would be feasible, for example, an electric drive with fuel cell power source, a hybrid combination of electric drive and some form of heat engine, or some form of heat engine with perhaps a mechanical or hydraulic drive. In the preferred approach, with reference to FIG. 5, the electric drive might typically consist of one or more dc traction or ac induction motors 51 coupled to the driving wheels by a power reduction assembly or assemblies (2 geared assembly, belt/pulley or chain/sprocket arrangement, or some functionally comparable means). With the dc traction motor/s, an SCR controller, in conjunction with the motor characteristics, would combine the functions of the accelerator, clutch and transmission, and could provide a capability for regenerative braking. The ac motor/s would, on the other hand, require use of an inverter with power SCRs to achieve the same functions. In both cases, power would be obtained from motive-type storage batteries 52. These could be any of several existing kinds, for example; lead-acid, lead-acid cobalt, nickel-cadmium, silver-zinc, etc., or, with time, possibly one of the developmental types like alkali-metal, or metal-air. Charging would be accomplished through an on-vehicle rectifier-charger incorporating an automatic charge control and shutoff and a means of isolating motor and accessory circuits during charging. Cabling, connectors, etc., and a accessory battery, accessory circuit and components would complete the electrical system of the car.

From the driver's standpoint the typical satellite car will be quite familiar in most respects having an accelerator pedal (actually the controller input), a directional selector lever, a brake pedal tied into a conventional service brake system, a standard parking brake, and a conventional steering wheel and steering mechanism.

Insofar as battery charging is concerned, means will be incorporated in the car for manual connection by the driver to a standard, residential ac outlet or a similar outlet at a parking garage, so a full charge may be taken on when the car is idle for a reasonably long period. Additionally, again referring to FIG. 5, each satellite car will be equipped with a special, shrouded, plate-type receptacle 53 so positioned as to make an automatic connection with connector 54a or 54b incorporated in a charging circuit on the transporter vehicle 14 when the car 18 is locked on the transporter for carriage over the suburban/central-city route. This will provide the batteries 52 with a booster charge enabling avoidance of frequent "deep discharge" conditions, and in effect would enhance the operating range characteristics of the car.

Basically, the transporter 14 will consist of a prime mover or truck tractor 16 (powered by a conventional, internal combustion, piston engine, or possibly a gas turbine or hybrid power system) and a semitrailer 15 or 40 configured and equipped to accommodate a number of the small satellite passenger cars. Both the tractor and the semitrailer will run on low profile tires and wheels to obtain a low, loaded center of gravity, and to reduce the elevation differences to be compensated for at the car loading areas in the collection/distribution stations.

The car accommodation deck or platform 17 of the transporter's semitrailer will be fitted with guideways such as 31 and 32 and 42 and 43 to simplify alignment of the cars when they are driven on board and to provide a predetermined separating distance when they are loaded. A transporter vehicle 14 is shown in FIGS. 1–3 in which the semitrailer is configured to accommodate lateral disposition of the satellite cars, placed front-end to front-end down the length of the deck. With this arrangement, the transporter would be loaded from drive-on/drive-off platform means 22a and 22b on both sides. A second, or alternative configuration of the transporter's semitrailer is depicted in plan in FIG. 4. Here, the car accommodation deck or platform 17 (with its superstructure) is pivotally mounted on the semitrailer chassis 44 so that it may be swung into position on the drive-on/drive-off platform 50. With the rear of the deck positioned on the platform 50, the satellite cars 18 can be driven directly on and disposed longitudinally in parallel rows down the length of the deck, guiding on the shoulders 42 and 43. Once the cars were secured on the deck, it would be moved back to its normal travel position and locked to the semitrailer chassis 44, converting the transporter back to a "conventional" configuration for freeway and expressway travel. For unloading, the car accommodation deck or platfrom 17 would be unlocked and rotated until its front rested on the drive-on/drive-off platform 50 so the cars 18 could be driven straight off, on to the platform (the arrangement indicated by the phantom lines in FIG. 4).

At each car space, means are incorporated in the deck or platfrom 17 of the semitrailer to lock the car securely to the deck and, in effect, cancel out the car's suspension system to eliminate the possibility of its swaying and bouncing when the transporter is underway. The locking means may be a remotely actuated, mechanical device, controlled by the driver of the transporter. The control will be equipped with an interlock to prevent release of the cars unless the transporter is properly positioned adjacent to drive-on/drive-off platforms in a loading area at a collection/distribution station. A manual override is incorporated in the control for release of the cars in an emergency. As mentioned previously, in the description of the satellite car 18, the locking means, referring to FIG. 5, will incorporate an electrical connector 54a and 54b so that when the car is locked in place it will be connected to a charging circuit on the transporter 14 and its batteries 52 will be provided a booster charge. Interlocks will be provided in the system to permit the flow of current only when the locking means and connector 54a or 54b are fully engaged with the receiving or mating structure and receptacle 53 on the car.

The charging circuit on the transporter 14, FIG. 5, will receive power from either an alternator (ac generator) 55 incorporated in the semitrailer or an alternator carried on the tractor (prime mover). An alternator on the semitrailer 15 or 40 could be driven by a small gas turbine, or some other form of heat engine equipped with a speed increaser. In the event the alternator is located on the tractor 16, it would preferably be driven by a power take-off (PTO) on the tractor's power plant; a means would be provided to connect the alternator output on the tractor to the charging circuit on the semitrailer.

To make the in-transit time spent on the transporter vehicle as pleasant and productive as possible for the satellite car passengers. It would be feasible to equip the semitrailer with small TV receivers 34 and 35. The receivers would be disposed so as to be easily visible from the cars' passenger compartments and could be set to display general-interest programming: News, weather, sports, etc.

The collection/distribution stations where the satellite cars will be driven on and off the transporter vehicles will be simply configured, possibly sheltered structures (in many areas, use could be made of existing parking lots and garages). They will be strategically located in the suburban and central-city areas and placed in such relationship to freeways, expressways, and surface streets as to take best advantage of existing on-ramps, off-ramps, transition roads, and connecting streets. The preferred disposition can be readily seen in FIG. 1. The stations will incorporate a lowered or reduced roadway 23 and drive-on/drive-off ramp and platfrom facilities 22 and 50 to bring the satellite cars and the transporter's car accommodation deck or platform 17 to equivalent elevations. The stations will also be so laid out as to guide the cars into areas where they may be positioned for rapid, drive-on loading of the transporters.

The same lane arrangements will, of course, facilitate drive-off unloading of the transporters and assure rapid clearing of the stations by the satellite cars. The section elevation of FIG. 3 shows a typical relation-ship of drive-on/drive-off loading ramp and platform means 22a and 22b, transporter vehicle roadway or channel 23, satellite cars 18, and transporter vehicle 14 during drive-on, lateral loading of the cars. Unloading would simply be the reverse of this operation. FIGS. 1–3 provide a general impression of a collection/distribution station and it may be seen that the one method, referred to just above, would involve loading and unloading cars from both sides of the transporter vehicle 14 at the same time. This is the lateral, or side-by-side type of loading for which, of course, the semitrailer would be specially configured.

In FIGS. 4 and 5, the views show an alternate loading method, requiring only one drive-on/drive-off platform 50 for each transporter vehicle. This method would utilize the previously described transporter 14 equipped with the rotating car accommodation deck or platform 17 pivotally mounted on the chassis 44 of semitrailer 40. The cars 18 would be aligned longitudinally on the deck in parallel rows so that, with the rear or front end of the deck swung over and resting on the platfrom 50, the cars could be driven straight on to or off the transporter.

The fourth element in the subject transportation system: the network of surface streets, freeways, expressways, and highways found in all central-city and suburban areas; obviously exists, may be readily and economically extended or supplemented, is well known, and need not be detailed here except to say that the collection/distribution stations may be suitably connected to it with a minimum of new construction.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A vehicular and personnel transportation system for processing both single individual occupied vehicles having self-propelling means and pluralities of individual occupied vehicles having self-propelling means grouped on a powered vehicular transporter apparatus comprising:

a main transit line or traffic artery having at least one lane of traffic in each of opposite directions and equipped with on-ramps and off-ramps communicating with surface streets and transporter loading platforms and adapted to accommodate in common independent travel of said individual vehicles including their occupants by said self-propelling means and travel of said powered vehicular transporter apparatus conveying grouped pluralities of said individual vehicles and the occupants thereof;

a number of individual vehicles having a self-propelling means and a configuration and body size of the smallest possible external dimensions consistent with accommodating two adults and incorporating directional and speed controls, an electrical power source and electric drive, suspension elements and a wheeled running gear;

said body including structural elements for mounting seating means, vision means, and door means for access thereto and egress therefrom;

said directional and speed controls including a steering means linkably connected to the front wheels of said individual vehicles, a control means combining the functions of an accelerator, clutch and transmission to regulate the output of said electric drive, and a braking means to decelerate and stop the motion of said individual vehicles;

said electrical power source and electric drive including rechargeable motive-type storage batteries, a charging circuit with connectors to mate with standard electrical outlets and a receptacle to mate with a charging circuit connector on said powered vehicular transporter apparatus, an electric motor drivingly coupled to the propulsive wheels of said individual vehicles by a power reduction assembly or assemblies;

said suspension elements and wheeled running gear including shock attenuating devices with axles and pneumatic-tired wheels depended therefrom, aforesaid wheels being spaced apart laterally and lengthwise by distances substantially less than the internationally standardized distances associated with the smallest of conventionally sized passenger automobiles;

a powered vehicular transporter apparatus being a combination of a motorized truck tractor and elongated semitrailer, aforesaid combination having overall a substantially conventional configuraton and substantially conventional external dimensions;

said motorized truck including a chassis means for mounting an operator's cab enclosure, directional, speed and braking control means, power means with an electrical generator means coupled thereto, propulsive drive means, suspension means with axles and pneumatic-tired wheels depended therefrom, and a fifth-wheel means for connectively engaging said elongated semitrailer;

said elongated semitrailer including a kingpin means for connectively engaging aforesaid fifth-wheel means on said motorized truck tractor, a frame means, suspension means with axles and pneumatic-tired wheels depend therefrom, a deck means and compartment means for supporting and housing a plurality of said individual vehicles and the occupants thereof in a controlled grouping for combined transportation from one place to another along said main transit line, aforesaid deck means and compartment means housing said individual vehicles in a pair of rows separated by a longitidinal curb extending between the opposite ends of aforesaid compartment means whereby said individual vehicles are laterally loaded into aforesaid compartment in a side-by-side relationship in each of two longitudinally disposed rows and facing each other when so loaded on opposite sides of aforesaid curb, the positioning of said individual vehicles in such manner defining laterally extensive and longitudinally disposed parking spaces on aforesaid elongated semitrailer deck means and within aforesaid compartment means, said parking spaces having locking means for selectively engaging underbody recesses of said individual vehicles to secure them in the parking spaces, aforesaid locking means incorporating an electrical connector mating with said electrical receptacle of said individual vehicles closing a circuit to aforesaid electrical generator means of said motorized truck tractor enabling recharging of said motive-type storage batteries of said individual vehicles during their conveyance by aforesaid powered vehicular transporter apparatus, said parking spaces also having television receiving sets and screens positioned for viewing by passengers occupying said individual vehicles placed in said parking spaces during their conveyance by said powered vehicular transporter apparatus, and said parking spaces further having at their outward edge an intermediate ramp means movably fixed to said deck to support said individual vehicles during their transfer from and to aforesaid transporter loading platforms and to engage the rear wheels of said individual vehicles in transit when vertically oriented.

2. A vehicular and personnel transportation system for processing both single individual occupied vehicles having self-propelling means and pluralities of individual occupied vehicles having self-propelling means grouped on a powered vehicular transporter apparatus comprising:

a main transit line or traffic artery having at least one lane of traffic in each of opposite directions and equipped with on-ramps and off-ramps communicating with surface streets and transporter loading platforms and adapted to accommodate in common independent travel of said individual vehicles including their occupants by said self-propelling means and travel of said powered vehicular transporter apparatus conveying grouped pluralities of said individual vehicles and the occupants thereof;

a number of individual vehicles having a self-propelling means and a configuration and body size of the smallest possible external dimensions consistent with accommodating two adults and incorporating directional and speed controls, and electrical power source and electric drive, suspension elements and a wheeled running gear;

said body including structural elements for mounting seating means, vision means, and door means for access thereto and egress therefrom;

said directional and speed controls including a steering means linkably connected to the front wheels of said individual vehicles, a control means combining the functions of an accelerator, clutch and transmission to regulate the output of said electric drive, and a braking means to decelerate and stop the motion of said individual vehicles;

said electrical power source and electric drive including rechargeable motive-type storage batteries, a charging circuit with connectors to mate with standard electrical outlets and a receptacle to mate with a charging circuit connector on said powered vehicular transporter apparatus, an electric motor drivingly coupled to the propulsive wheels of said individual vehicles by a power reduction assembly or assemblies;

said suspension elements and wheeled running gear including shock attenuating devices with axles and pneumatic-tired wheels depended therefrom, aforesaid wheels being spaced apart laterally and lengthwise by distances substantially less than the internationally standardized distances associated with the smallest of conventionally sized passenger automobiles;

a powered vehicular transporter apparatus being a combination of a motorized truck tractor and elongated semitrailer, aforesaid combination having overall a substantially conventional configuration and substantially conventional external dimensions;

said motorized truck tractor including a chassis means for mounting an operator's cab enclosure, directional, speed and braking control means, power means with an electrical generator means coupled thereto, propulsive drive means, suspension means with axles and pneumatic-tired wheels depended therefrom, and a fifth-wheel means for connectively engaging said elongated semitrailer;

said elongated semitrailer including a kingpin means for connectively engaging aforesaid fifth-wheel means on said motorized truck tractor, a frame means, suspension means with axles and pneumatic-tired wheels depended therefrom, a deck means and compartment means for supporting and housing a plurality of said individual vehicles and the occupants thereof in a controlled grouping for combined transportation from one place to another along said main transit line, aforesaid deck means and compartment means fixedly attached thereto being pivotally mounted on aforesaid frame means so as to enable their rotation by a power means and gear means included in said frame means to such horizontally angled positions as to be cooperatively coextensive at the rear or front end with said transporter loading platforms of slightly less elevation, each end of said compartment means being equipped with movable closures or doors which open downward to function as intermediate ramps during loading and unloading of said individual vehicles, said deck means for supporting said individual vehicles having space defining means determining a plurality of longitudinally extensive, laterally spaced apart parking spaces for the carriage of said individual vehicles one behind the other in two parallel longitudinal rows, said parking spaces having locking means for selectively engaging underbody recesses of said individual vehicles to secure them in the parking spaces, aforesaid locking means incorporating an electrical connector mating with said electrical receptacle of said individual vehicles closing a circuit to aforesaid electrical generator means of said motorized truck tractor enabling recharging of said motive-type storage batteries of said individual vehicles during their conveyance by aforesaid powered vehicular transporter apparatus, said parking spaces also having television receiving sets and screens positioned for viewing by passengers occupying said individual vehicles placed in said parking spaces during their conveyance by said powered vehicular transporter apparatus.

* * * * *